United States Patent [19]

Tomisawa

[11] Patent Number: 5,579,737
[45] Date of Patent: Dec. 3, 1996

[54] METHOD AND APPARATUS FOR ELECTRONICALLY CONTROLLING A FUEL SUPPLY TO AN INTERNAL COMBUSTION ENGINE

[75] Inventor: Naoki Tomisawa, Atsugi, Japan

[73] Assignee: Unisia Jecs Corporation, Atsugi, Japan

[21] Appl. No.: 277,262

[22] Filed: Jul. 21, 1994

[30] Foreign Application Priority Data

Jul. 21, 1993 [JP] Japan .................................. 5-180293
Jul. 23, 1993 [JP] Japan .................................. 5-182852

[51] Int. Cl.$^6$ .................................................. F02D 41/06
[52] U.S. Cl. ................................................................ 123/435
[58] Field of Search ................................ 123/435, 436, 123/575, 1 A

[56] References Cited

U.S. PATENT DOCUMENTS 4,942,848  7/1990  Terasaka ................................ 123/1 A
5,353,764 10/1994  Tomisawa ............................. 123/435

FOREIGN PATENT DOCUMENTS 62-162364 10/1987 Japan .
63-17432   2/1988 Japan .
5-195840   8/1993 Japan .

Primary Examiner—Andrew M. Dolinar
Attorney, Agent, or Firm—Foley & Lardner

[57] ABSTRACT

Engine output fluctuations are detected based on combustion pressure, and a fuel supply quantity amended so that the output fluctuations approach a permissible limit value. The properties of the fuel being used, can be estimated based on the amendment level, using characteristics that the limit air fuel ratio for stable combustion becomes leaner as the fuel being used is more volatile. Then when the fuel being used is volatile, the target air-fuel ratio in the air-fuel ratio feedback control is made leaner, thereby improving fuel consumption and exhaust gas properties.

8 Claims, 8 Drawing Sheets

METHOD AND APPARATUS FOR ELECTRONICALLY CONTROLLING A FUEL SUPPLY TO AN INTERNAL COMBUSTION ENGINE

FIELD OF THE INVENTION

The present invention relates to method and apparatus for electronically controlling a fuel supply to an internal combustion engine, and in particular to technology for correcting a fuel supply quantity to correspond to properties of a fuel being used.

DESCRIPTION OF THE RELATED ART

With conventional electronically controlled fuel supply apparatus for internal combustion engines, the intake air quantity to the engine is detected, then a fuel supply quantity to form a target air-fuel ratio mixture is computed based on the intake air quantity, and the fuel injection valve driven according to the fuel supply quantity.

If an engine is not warmed up, most of fuel injected from the fuel injection valve becomes attached in liquid form in the vicinity of the intake valve, thus reducing the fuel quantity actually drawn into a cylinder so that the air-fuel ratio of the intake mixture becomes leaner. The fuel supply quantity is therefore increase corrected in accordance with the cooling water temperature (which represents engine temperature), to thereby prevent the air-fuel ratio becoming leaner (refer to Japanese Unexamined Utility Model Publication No. 62-162634).

Depending on the properties (mainly volatility) of the fuel being used at the time, however, the attachment rate (proportion of the injected fuel that becomes attached in the vicinity of the intake valve to the injected fuel), and the evaporation rate (the proportion of the attached fuel that evaporates from the attached fuel and is drawn into the cylinder), vary even under the same temperature conditions.

The practice has therefore been to increase the fuel quantity, proportionally corresponding to the water temperature, large enough to ensure a surplus, even when fuels which are most likely to cause a lean air-fuel ratio (heavy fuels of low volatility) are used, and thus prevent misfiring due to leanness of the air-fuel ratio, and the surges accompanying misfire.

Consequently, when a light fuel (standard fuel) which has a comparatively high volatility is used, the fuel quantity increase correction becomes excessive, resulting in an over rich air-fuel ratio, causing high fuel consumption and a deterioration in exhaust gas properties.

In this regard, the present inventors have previously proposed, in Japanese Patent Application No. 4-5846, an apparatus wherein a quantity increase correction value corresponding to the water temperature, having previously been set large to ensure a surplus, is decremented within a range wherein the surge torque does not exceed a constant permissible limit value, to thereby carry out quantity increase correction to a minimum limit necessary for the fuel being used at the time.

With such a control wherein the quantity increase correction value is amended based on the surge torque, when the engine is stopped, the quantity increase correction value returns to an initial value. Amendment control is therefore always from the initial value on engine start-up.

Accordingly, even if the fuel tank is not refuelled while the engine is stopped, the quantity increase correction value, which has been amended to a value appropriate for the fuel being used at the time (fuel in the fuel tank), is reset, and amendment control starts again from the initial value. In this regard, if in the case of no refuelling, the results from amendment control from the previous operating time are used from the beginning at the next start-up time, then a quantity increase correction appropriate for the fuel used at that time can be carried out immediately after the engine starts, thus enabling a further improvement in fuel controllability at start-up.

However, with this arrangement, once the engine has stopped there is the possibility of refuelling, and if this is with a heavier fuel, then when the previous amendment correction results are used as is, there may be a significant impairment to the startability due to insufficient quantity increase correction. Amendment control must therefore, as a precaution, be carried out from the initial value at every start-up.

With the conventional control, although the quantity increase correction value during warm up can be optimized to correspond to the fuel properties, a construction that the target air-fuel ratio in the air-fuel ratio feedback control after warm up is not set to correspond to the fuel properties. During warm up, then in spite of the possibility of a leaner target air-fuel ratio due to good fuel properties, the air-fuel ratio is controlled to a constant target air-fuel ratio unrelated to the fuel properties. Hence, fuel consumption and exhaust gas properties cannot be improved to their maximum limit.

Moreover, with an engine having a large number of cylinders and a high exhaust gas flow rate, for example, an eight cylinder engine, since such an engine has a high rotational stability and high output torque, then when the properties of the fuel used are relatively good (for example a light fuel), the surge torque will not necessarily exceed the permissible level even if the target air-fuel ratio of feedback control is made leaner than that when using a heavy fuel.

Making the target air-fuel ratio lean in this way is conditional upon good properties for the fuel being used. Therefore, under operational environments where fuels having good properties (light fuels) are not always used, it is not possible to make the target air-fuel ratio lean. Consequently, the air-fuel ratio feedback control is conventionally controlled richer than necessary even though the quantity increase correction amount during warm up can be suppressed to the minimum required limit. There is thus still room for improvement of the fuel consumption and exhaust gas properties.

SUMMARY OF THE INVENTION

With a view to overcoming the foregoing deficiencies in the prior art, it is an object of the present invention to be able to at least prevent a deterioration in startability due to an insufficient quantity increase, by detecting if the fuel tank has been refuelled, and if the fuel being used has not changed, using the quantity increase correction value already been amendment controlled continuously as is, while if there is a possibility of a change in the properties of the fuel being used, then as a precaution, resetting the quantity increase correction value to the initial value.

Moreover, it is an object of the present invention to provide an electronically controlled fuel supply apparatus that can control the quantity increase correction during warm up, and make the target air-fuel ratio lean in the air-fuel ratio feedback control after warm up, without the generation of surge torque.

To achieve the above objectives, the method and apparatus for electronically controlling fuel supply to an internal combustion engine according to the present invention involves quantity increase correcting the fuel supply quantity to the engine in accordance with engine temperature, and amending the quantity increase correction amount so that engine output fluctuations approach a previously set permissible limit value. Here, the construction may involve detecting if a fuel tank, which stores fuel for supply to the engine, has been refuelled, and resetting the quantity increase correction amount to an initial value, only when detected that the fuel tank has been refuelled.

With such a construction, the quantity increase correction amount amended based on the output fluctuations, retains its amended value provided there has been no refuelling. This avoids the resetting of a quantity increase correction amount to be adjusted to correspond to the fuel properties, when there is no change in the fuel properties.

Here, refuelling may be determined based on a difference between a detected amount of fuel remaining in the fuel tank when a key switch is switched off and a detected amount of fuel remaining in the fuel tank when the key switch is switched on.

That is to say, since refuelling is usually carried out with the key switch being switched off, then when the amount of fuel remaining in the fuel tank on switching on the key switch is more than when the key switch was switched off, it can be assumed that the increase in the remaining fuel amount is due to refuelling.

With the method and apparatus for electronically controlling fuel supply to an internal combustion engine according to the present invention, the fuel supply quantity to the engine may be amended so that engine output fluctuations approach a previously set permissible limit value, and the target air-fuel ratio of an air-fuel ratio feedback control may be set based on the amended value. In this respect, the construction may involve feedback controlling the fuel supply quantity to the engine so that the air-fuel ratio of the engine intake mixture approaches the set target air-fuel ratio.

With such a construction, the fuel properties can be estimated on the basis of the amendment amount for the fuel supply quantity based on the output fluctuations. Also, since the appropriate value for the target air-fuel ratio in the air-fuel ratio feedback control differs depending on the fuel properties, the target air-fuel ratio can be set based on the amendment amount so that the air-fuel ratio can be feedback controlled to an air-fuel ratio appropriate for the properties of the fuel being used at the time.

Here, the construction may involve amending the target air-fuel ratio in the air-fuel ratio feedback control towards the richer side as the air-fuel ratio becoming richer due to amendment of the fuel supply quantity based on output fluctuations.

With such a construction, when due to using a fuel of low volatility, the air-fuel ratio to avoid the occurrence of output fluctuations is made comparatively rich, the target air-fuel ratio of the air-fuel ratio feedback control is also made richer. On the other hand, when due to using a fuel of high volatility, the air-fuel ratio, to avoid the occurrence of output fluctuations, is made comparatively lean. The target air-fuel ratio of the air-fuel ratio feedback control is also made leaner. The air-fuel ratio can thus be controlled to a target air-fuel ratio to suit the volatility of the fuel being used at the time.

Moreover when the feedback control of the air-fuel ratio involves proportional-plus-integral control of a correction value for the fuel supply quantity, the construction may involve changing the target air-fuel ratio in the air-fuel ratio feedback control by correcting the operating amount of the proportional control in accordance with the correction amount for the fuel supply quantity based on the output fluctuations.

With such a construction, since the control air-fuel ratio for the air-fuel ratio feedback control is deviated by correction of the proportional operating amount, the target air-fuel ratio can be amended to a suitable value to correspond to the fuel properties.

Moreover the construction may involve detecting engine output fluctuations based on fluctuations in the combustion pressure.

With such a construction engine output fluctuations can be detected from fluctuations in the combustion pressure arising from unstable combustion due to an insufficient fuel supply quantity.

Moreover the construction may involve detecting the engine output fluctuations under engine idle conditions.

With such a construction, the generation of output fluctuations due to setting a fuel supply quantity inappropriate for the fuel properties can be accurately detected and discriminated from output fluctuations due to other causes.

Other objects and aspects of the present invention will become apparent from the following description of embodiments given in conjunction with the appended drawings.

DETAILED DESCRIPTION OF THE PREFERRED EMBODIMENTS

Figure 1:
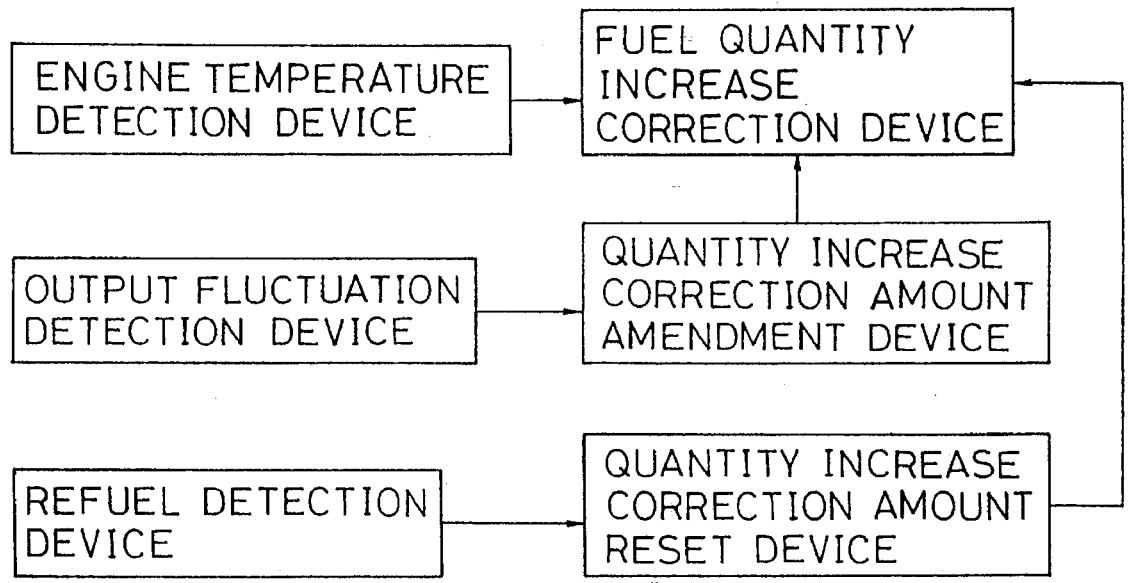
FIG. 1 is a block diagram showing a first embodiment of a basic arrangement of an apparatus according to the present invention.

A first embodiment of a method and apparatus for electronically controlling a fuel supply to an internal combustion engine according to the present invention is illustrated by FIG. 3 through FIG. 6, while a basic arrangement of the apparatus for electronically controlling the fuel supply according to the first embodiment is shown in FIG. 1.

Figure 3:
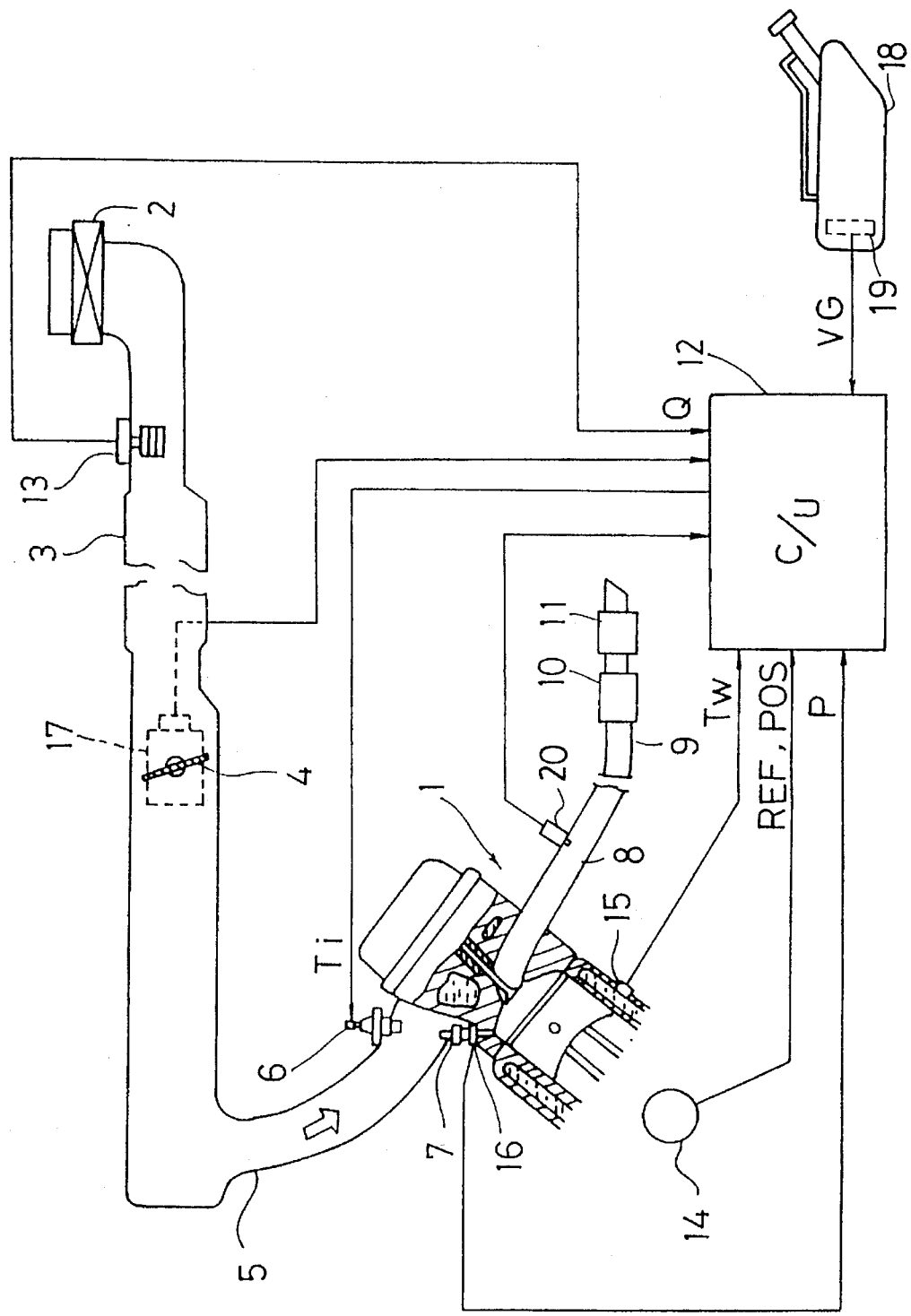
FIG. 3 is a schematic system diagram common to both the first and second embodiments of the invention.

Referring to the system structure of the first embodiment shown in FIG. 3, an internal combustion engine 1 draws in air from an air cleaner 2 by way of an intake duct 3, a throttle valve 4, and an intake manifold 5.

Fuel injection valves 6 are provided for each cylinder, in respective branch portions of the intake manifold 5. The fuel injection valves 6 are electromagnetic type fuel injection valves that open with power to a solenoid and close with power shut-off. The fuel injection valves 6 are driven open in response to an injection pulse signal provided by a control unit 12 (to be described later) so that fuel from a fuel tank 18, which is pressurized by a fuel pump (not shown), and controlled to a predetermined pressure by means of a pressure regulator, is injected intermittently to the engine 1.

Ignition plugs 7 are provided for each combustion chamber of the engine 1 for spark ignition of a mixture therein. Exhaust from the engine 1 is discharged by way of an exhaust manifold 8, an exhaust duct 9, a catalytic converter 10 and a muffler 11.

The control unit 12 provided for electronic control of the fuel supply to the engine, incorporates a microcomputer having a CPU, ROM, RAM, A/D converter, input/output interface and so on. The control unit 12 receives input signals from various sensors and carries out computational processing (as described later) to thereby control the operation of the fuel injection valves 6.

For the various sensors there is provided in the intake duct 3, an airflow meter 13 that outputs a signal corresponding to the intake air quantity Q of the engine 1.

Also provided is a crank angle sensor 14, which outputs a reference crank angle signal REF for each reference crank angle position (for example for each TDC), and a unit crank angle signal POS for each 1° or 2° of crank angle. The period of the reference crank angle signal REF, or the number of unit crank angle signals POS within a predetermined period is measured, to compute an engine rotational speed Ne.

Moreover, a water temperature sensor 15 is provided for detecting the cooling water temperature Tw in the water jacket of the engine 1. The cooling water temperature Tw is a parameter representing engine temperature, while the water temperature sensor 15 corresponds to an engine temperature detection device (see FIG. 1) of the embodiments.

Cylinder pressure sensors 16 of the ignition plug washer type such as disclosed in Japanese Unexamined Utility Model Publication No. 63-17432, are provided for each ignition plug 7, to thereby detect the cylinder pressures (combustion pressures) of each cylinder. The combustion pressure is detected based on a change, due to the combustion pressure, in the sensor load applied when tightening the ignition plug.

Instead of the above mentioned ignition plug washer type cylinder pressure sensor 16, a type having a sensor portion facing directly into the combustion chamber to detect cylinder pressure as an absolute pressure is also possible.

Provided on the throttle valve 4 is an idle switch 17, which is switched on when the throttle valve 4 is fully closed (idle position).

Moreover the fuel tank 18 that stores fuel for supply to the engine 1 incorporates a fuel gauge 19 (remaining fuel quantity detection device).

An oxygen sensor 20 is provided as an air-fuel ratio detection device, at a junction portion of the exhaust manifold 8. The oxygen sensor 20 is a known sensor that generates an electromotive force $V_{O2}$ corresponding to a ratio of the partial pressure of the oxygen in the exhaust gas to the partial pressure of the oxygen in standard air (atmospheric air), and utilizes the fact that the concentration of oxygen in the exhaust gas drastically changes around the theoretical air-fuel ratio, to detect if the exhaust air-fuel ratio is richer or leaner than the theoretical air-fuel ratio.

The CPU of the microcomputer in the control unit 12 computes a basic injection pulse width Tp from the intake air quantity Q detected by the airflow meter 13, and the engine rotational speed Ne computed on the basis of detection signals from the crank angle sensor 14 (Tp=K×Q/Ne, where K is a constant).

Moreover the CPU set various correction coefficients COEF (COEF=1 +$K_{TW}$+ . . . ) including a quantity increase correction coefficient $K_{TW}$ for correction of the basic injection pulse width (basic fuel injection quantity) Tp in accordance with the cooling water temperature Tw (representative of engine temperature), and corrects the basic fuel injection pulse width Tp using the various correction coefficients COEF, to thereby compute an effective injection pulse width Te (Te=Tp×COEF).

Furthermore, the CPU sets a voltage correction portion Ts to correct changes in the effective opening time of the fuel injection valve 6 due to battery voltage, and adds the voltage correction portion Ts to the effective injection pulse width Te to obtain a final injection pulse width Ti (Ti=Te+Ts).

An injection pulse signal of injection pulse width Ti (fuel supply quantity) is output to the fuel injection valve 6 at a predetermined injection timing to thereby electronically control fuel injection by the fuel injection valve 6.

A function of quantity increase correction computation provided by the control unit 12 based on the quantity increase correction coefficient $K_{TW}$, a function of outputting the injection pulse signal of injection pulse width Ti given an increase correction to the fuel injection valve at the predetermined timing, and the fuel injection valve that is driven to open in response to the injection pulse signal constitute the fuel quantity increase correction device (see FIG. 1) of the present embodiment.

Here, the quantity increase correction coefficient $K_{TW}$ is pre-stored in a map of parameters of cooling water temperature Tw, and is set with a large initial value so that even when a heavy fuel having the greatest requirements for quantity increase is used, there will be a surplus to prevent surge torque (output fluctuations) above a permissible level.

The quantity increase correction coefficient $K_{TW}$ thus gives an even greater increase correction of the injection pulse width (injection quantity) increase thereof.

Accordingly, when light fuel is ordinarily used, the quantity increase correction coefficient $K_{tw}$ will give an excessive quantity increase correction. The control unit 12 therefore has a function as shown in the flow charts of FIG. 4 through FIG. 6 of amending the quantity increase correction coefficient $K_{TW}$ to the minimum level required for the fuel being used at the time.

Figure 4:
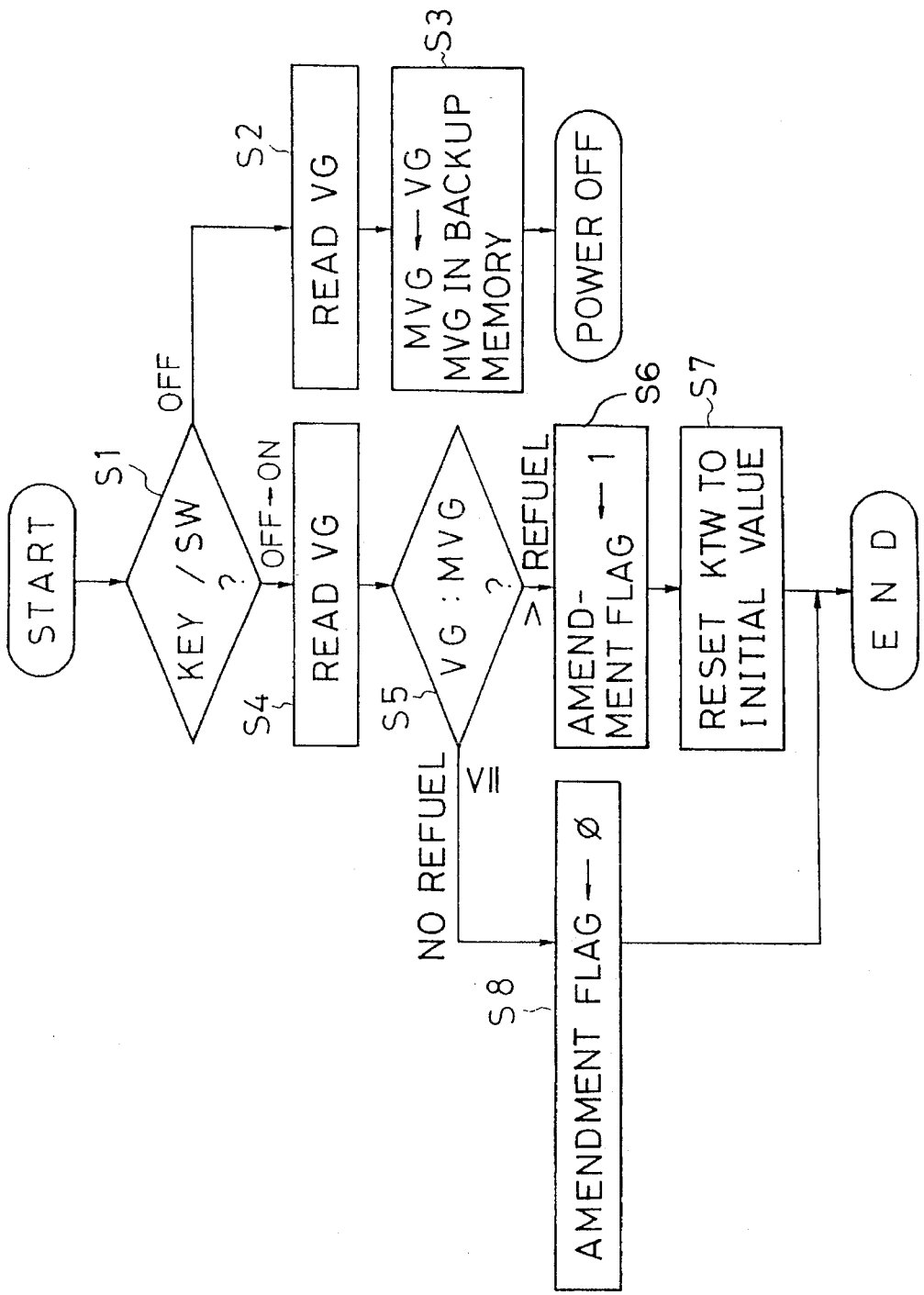
FIG. 4 is a flow chart showing a refuelling detection control routine according to the first embodiment.
Figure 5:
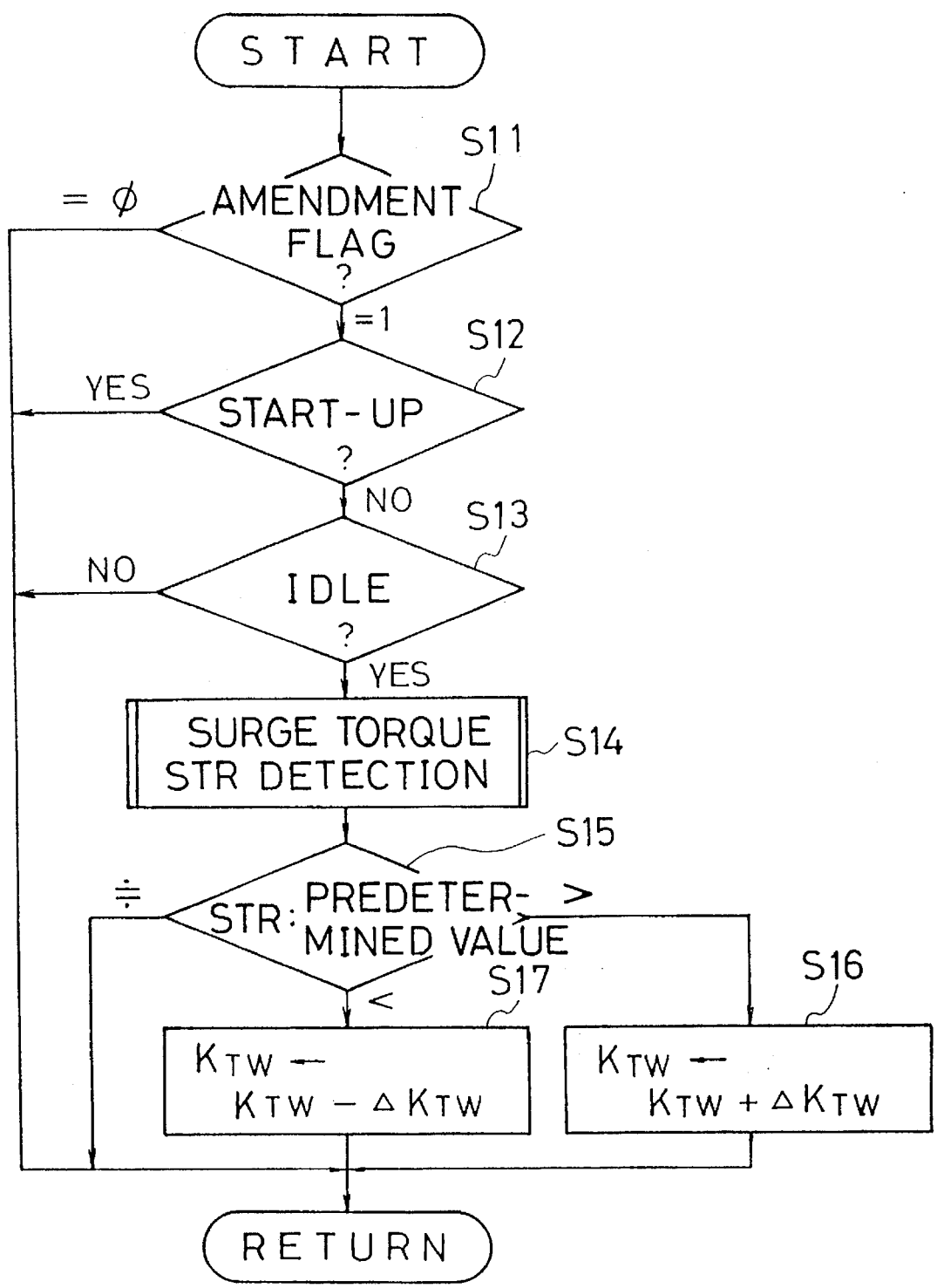
FIG. 5 is a flow chart showing an amendment control routine for fuel quantity increase correction according to the first embodiment.
Figure 6:
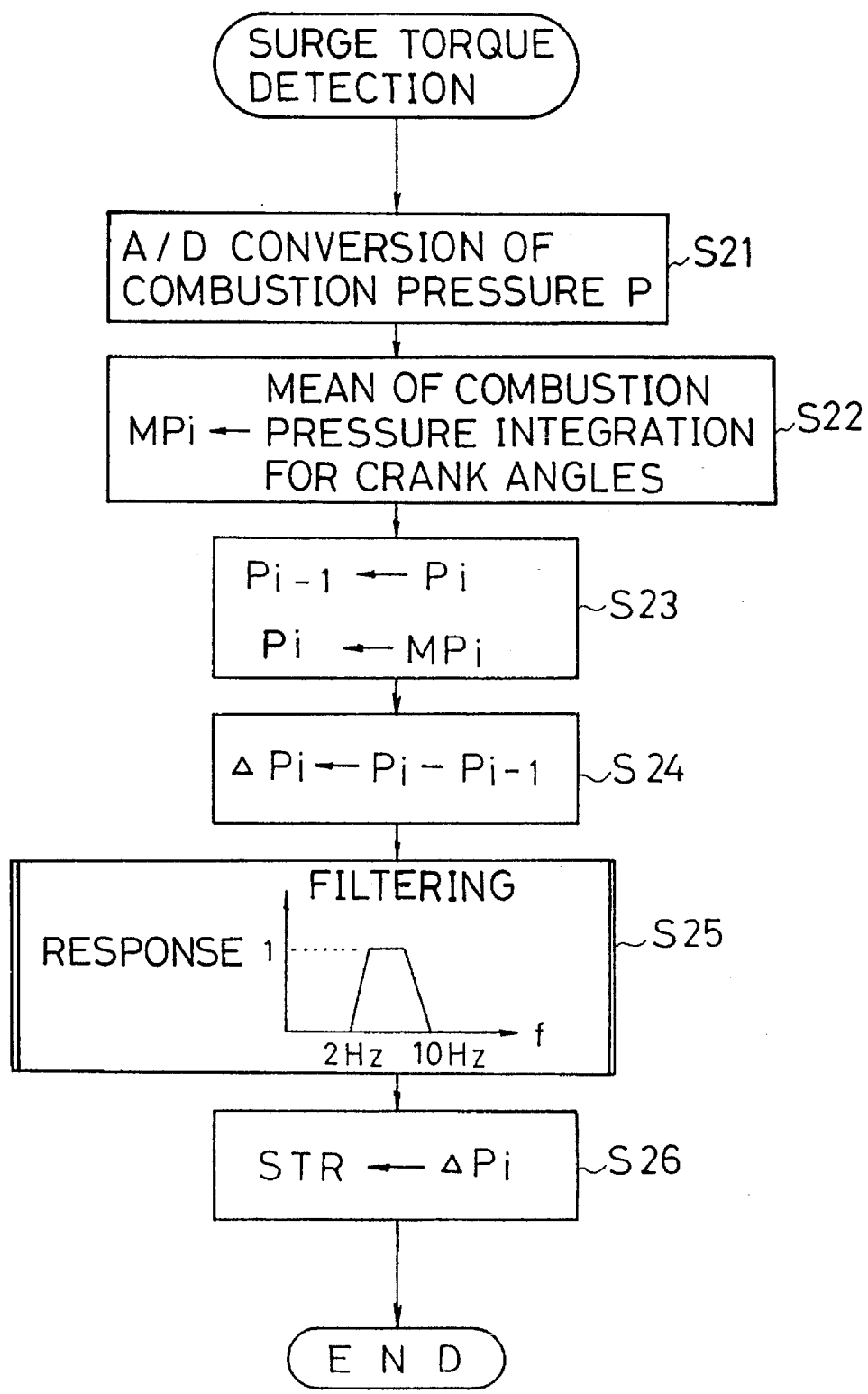
FIG. 6 is a flow chart showing a surge torque detection control routine common to both the first and second embodiments.

In the present embodiment, the functions of a quantity increase correction amount amendment device and a quantity increase correction amount reset device (see FIG. 1) of the present embodiment are respectively realized by the function of software illustrated by the flow chart of FIG. 5 and stored in the control unit 12, and by the function of software illustrated by step 7 of the flow chart of FIG. 4 and stored in the control unit 12, and the memory of the control unit storing the initial value, while the output fluctuation detection device (see FIG. 1) of the present embodiment is realized by the function of software illustrated by the flow chart of FIG. 6 and stored in the control unit 12, and by the cylinder pressure sensor 16 as the combustion pressure detection device, and by the crank angle sensor 14 for detecting integration period of cylinder pressure. Moreover, the refuelling detection device (see FIG. 1) of the present embodiment is realized by the function of software illustrated by steps S1–S6 and S8 of the flow chart of FIG. 4 and stored in the control unit 12, and by the fuel gauge 19 as a remaining fuel amount detection device, and by a backup memory described later.

The program illustrated by the flow chart of FIG. 4 is for detecting refuelling of the fuel tank 18.

In the flow chart of FIG. 4, initially in step 1 (with "step" denoted by S in the figures), it is judged if the key switch is on or off. If the key switch is off, control proceeds to step 2 where the output VG from the fuel gage 19 at the time is read. Then in the next step 3, the output VG read in step 2 is set to a label name MVG as the remaining fuel quantity immediately prior to engine stop. The remaining quantity data MVG is then stored in a backup memory. The power then switches off automatically to finish the program.

When starting, the key switch is switched from off to on, control proceeds to step 4, where the output VG of the fuel gauge 19 is again read.

Control then proceeds to step 5 where the remaining quantity data MVG that was read and stored when the key switch was off is compared with the remaining quantity data VG read in step 4. When the remaining fuel quantity in the fuel tank 18 has increased (VG>MVG), that is to say when estimated that refuelling took place while the engine was stopped, control proceeds to step 6 where a "1" is set for the amendment flag. Then, in the next step 7, the quantity increase correction coefficient $K_{TW}$ stored in the map is reset to the initial value.

On the other hand, if after comparing the output MVG for when the key switch was off with the output VG for immediately after switching on the key switch, an increase change of the remaining fuel quantity in the fuel tank 18 is not observed, it is judged that refuelling did not take place while the engine was stopped, and control proceeds to step 8 where a "φ" is set for the amendment flag.

By comparing in this way the remaining fuel quantity when the key switch was off (when the engine is stopped) with the remaining fuel quantity immediately after switching on the key switch, it can be judged if the remaining fuel quantity in the fuel tank 18 has changed while the engine was stopped. When estimated due to an increase change in the remaining fuel quantity that refuelling has taken place, a "1" is set for the amendment flag, while when considered that refuelling has not taken place, a "φ" is set for the amendment flag.

When refuelling is detected, the amendment flag may be kept at "1" until amendment control of the quantity increase correction coefficient $K_{TW}$ is carried out, thereby avoiding any erroneous control due to switching off the key switch while the engine 1 is not operating.

The amendment flag is judged in the amendment control routine for the quantity increase correction coefficient $K_{TW}$, illustrated by the flow chart of FIG. 5.

In step 11 of the flow chart of FIG. 5, the amendment flag is judged. If a "1" is set for the amendment flag, this indicates that refuelling has taken place while the engine is stopped. In this case, while it is possible that refuelling has been with fuel having the same properties as that already in the fuel tank 18 before refuelling, there is also the possibility that refuelling has been with a fuel of different properties. Therefore, as mentioned before, the quantity increase correction coefficient $K_{TW}$ is reset to the initial value, since in the case of refuelling with fuel having different properties, the quantity increase correction coefficient $K_{TW}$ which has been made appropriate for the properties of the fuel before refuelling would no longer be appropriate. Control then proceeds on to step 12 and subsequent steps to again amend the quantity increase correction coefficient $K_{tw}$ to a value that matches the properties of the fuel after refuelling.

In step 12, determination of engine start-up (cranking) is judged based on an on/off switching of a starter switch (not shown), and the engine rotational speed Ne.

If the engine is not being started, control proceeds to step 13 where it is judged from the on/off condition of the idle switch 17, if engine idle conditions are present.

When idle conditions are present, control proceeds to step 14 for detection of the engine surge torque (STR). Detection of the surge torque in step 14 is illustrated in detail in the flow chart of FIG. 6 to be explained fully later.

When surge torque is detected in step 14, then in step 15, the detected surge torque is compared with a previously set predetermined value (surge torque permissible limit value).

When the surge torque is below the predetermined value, control proceeds to step 17 where the quantity increase correction coefficient $K_{TW}$ stored in the map as a value corresponding to the current cooling water temperature Tw, is decremented by a predetermined value $\Delta K_{TW}$. On the other hand, when the surge torque is above the predetermined value, then in step 16 the quantity increase correction coefficient $K_{TW}$ for the relevant cooling water temperature Tw is incremented by a predetermined value $\Delta K_{TW}$. The air-fuel ratio is thus made richer, stabilizing combustion so that surge torque generation above the permissible level can be eliminated.

The quantity increase correction coefficient $K_{TW}$ (quantity increase correction level) is thus amended to be as small as possible within the limits wherein the surge torque does not exceed a predetermined value (surge torque permissible limit value), and the value on which the quantity increase correction coefficient $K_{TW}$ at this time corresponds to a difference in the correction requirement levels for the properties of the fuel being used at the time.

Preferably, the predetermined value $\Delta K_{TW}$ for decrementation of the quantity increase correction coefficient $K_{TW}$ is set smaller than the predetermined value $\Delta K_{TW}$ for incrementation. Moreover, as well as amending the quantity increase correction coefficient $K_{TW}$ corresponding to the relevant water temperature Tw, it is also desirable to simultaneously and in the same proportion amend the quantity increase correction coefficients $K_{TW}$ corresponding to other water temperature conditions. Furthermore, the predetermined value with which the surge torque is compared may be changed in accordance with conditions such as elapsed time after start-up, and water temperature.

When judged in step 11 that a "φ" has been set for the amendment flag, this indicates that refuelling has not taken place while the engine is stopped. In this case, the properties of the fuel used in the current operation are estimated to be the same as those for the previous operation. Consequently, the value of the quantity increase correction coefficient $K_{TW}$ amended based on the detection results of the surge torque for the previous time or times before that, can be considered also suitable for the fuel currently being used. It is therefore preferably used as is for carrying out appropriate quantity increase correction, with no need for the resetting to the initial value.

When judged in step 11 that a "φ" has been set for the amendment flag, since this determines that the amendment results up until the previous time can be used as is, the main program is terminated without reset of the quantity increase correction coefficient $K_{TW}$, or execution of the correction control in steps 12 through step 16.

Accordingly, since the properties of the fuel have not changed, the quantity increase correction coefficient $K_{TW}$ that has been amendment controlled for the operating time immediately after refuelling is used continuously as is until the next refuelling, without being gradually amended from the initial value thereof each time the engine is started. Therefore, the quantity increase can be corrected to the minimum required limit appropriate for the fuel being used at the time, from immediately after start-up.

Next is a description in accordance with the flow chart of FIG. 6, of the aspects of the surge torque detection in step 14 of the flow chart of FIG. 5.

In the flow chart of FIG. 6, initially in step 21, detection signals from the cylinder pressure sensor 16 corresponding to the cylinder pressure P are A/D converted and read.

Then in step 22, a value MPi corresponding to a mean effective pressure is computed by integrating the output from the cylinder pressure sensor 16 over a range of predetermined crank angles.

In step 23, the newly computed value MPi is set to Pi as a latest value while the previous value is set to Pi–1.

Then in step 24, the previous value of Pi–1 is subtracted from the current value Pi to obtain a mean effective pressure fluctuation component ΔPi.

In step 25, filtering is carried out to extract only specific frequency components of the mean effective pressure fluctuation component ΔPi.

Here, the specific frequency components are for a frequency region corresponding to the principal components of torsional vibration in the vehicle drive system due to engine output fluctuations. Preferably the frequency region is one that overlaps the frequency region most easily felt by the vehicle passengers (for example from 2 Hz–10 Hz).

Then in step 26, the fluctuation component ΔPi that has been subjected to filtering is set to a value STR corresponding to the surge torque.

With the flow chart of FIG. 6, the engine output fluctuation (surge torque) is obtained based on the cylinder pressure (combustion pressure). However, the construction is not limited to one using cylinder pressure and instead the surge torque may be obtained for example based on fluctuations in rotation.

Moreover, with the above embodiment, refuelling of the fuel tank 18 is detected based on a change in the remaining fuel quantity detected by the fuel gauge 19. However, the construction is not limited to such refuelling detection, but may involve for example refuelling detection based on opening or closing of the filler cap, or a change in pressure inside the fuel tank.

Figure 2:
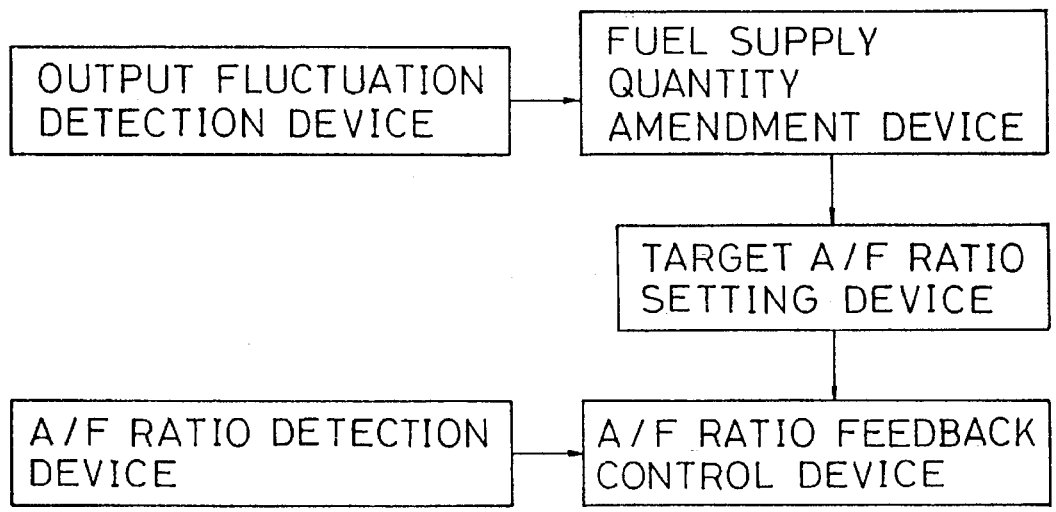
FIG. 2 is a block diagram showing a second embodiment of a basic arrangement of an apparatus according to the present invention.
Figure 7:
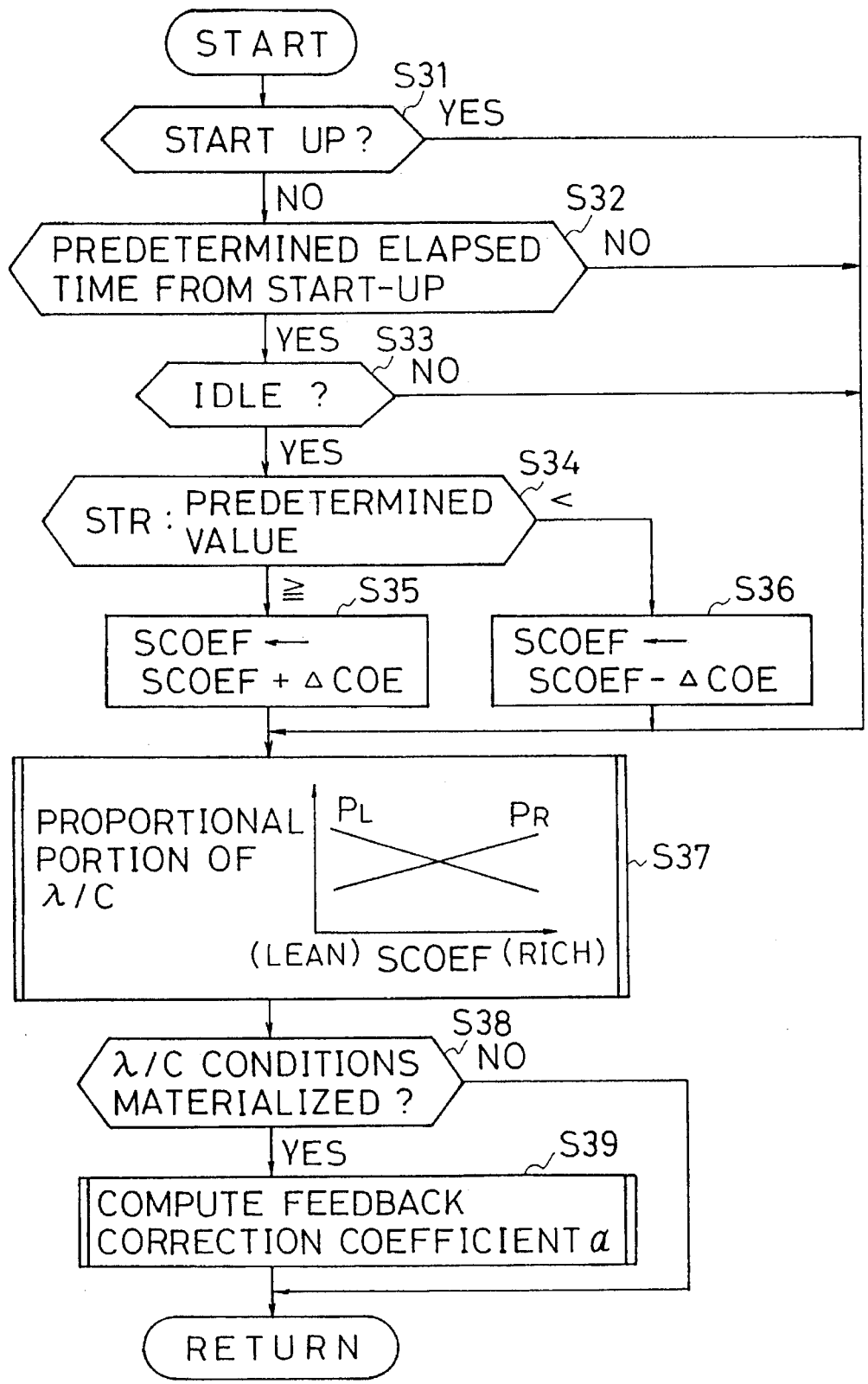
FIG. 7 is a flow chart showing an output fluctuation based fuel correction control routine, according to the second embodiment.
Figure 8:
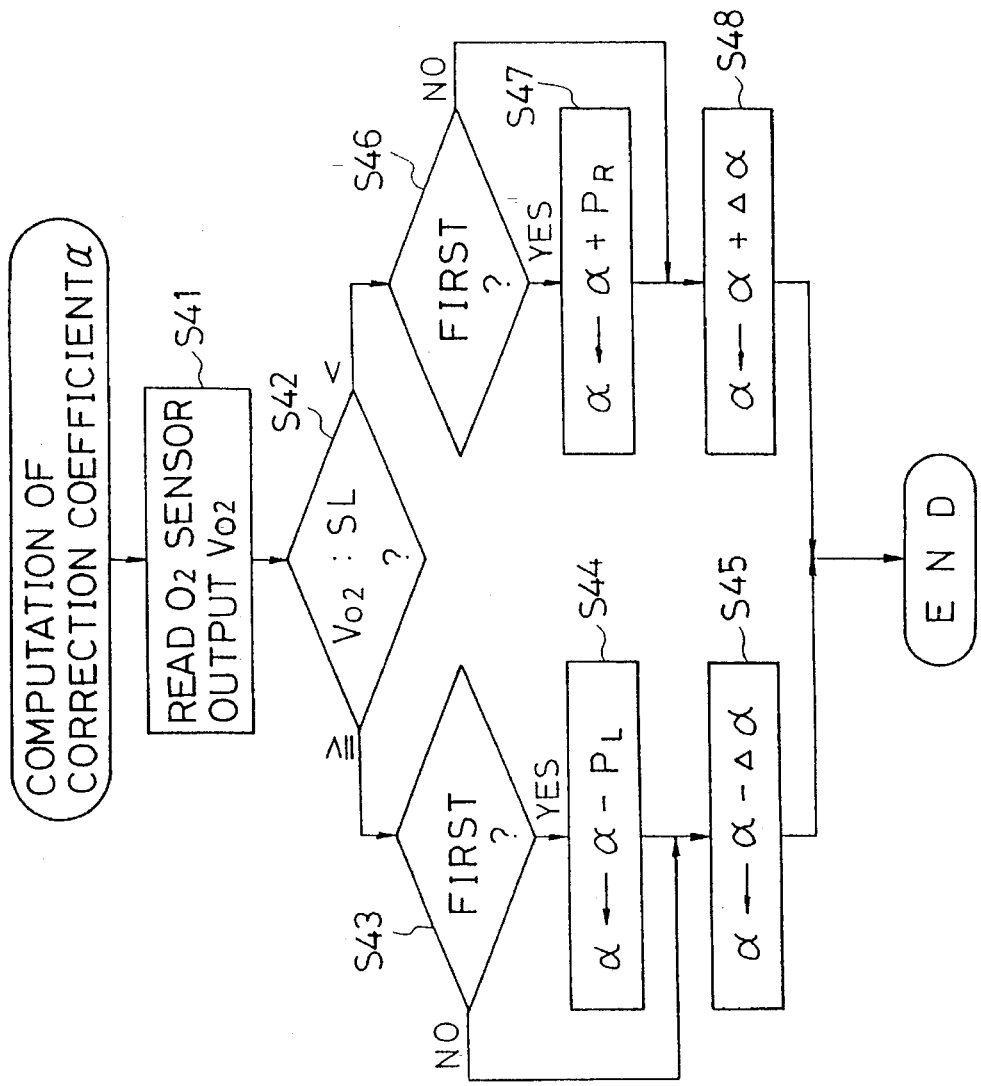
FIG. 8 is a flow chart showing an air-fuel ratio feedback control routine, according to the second embodiment.
Figure 9:
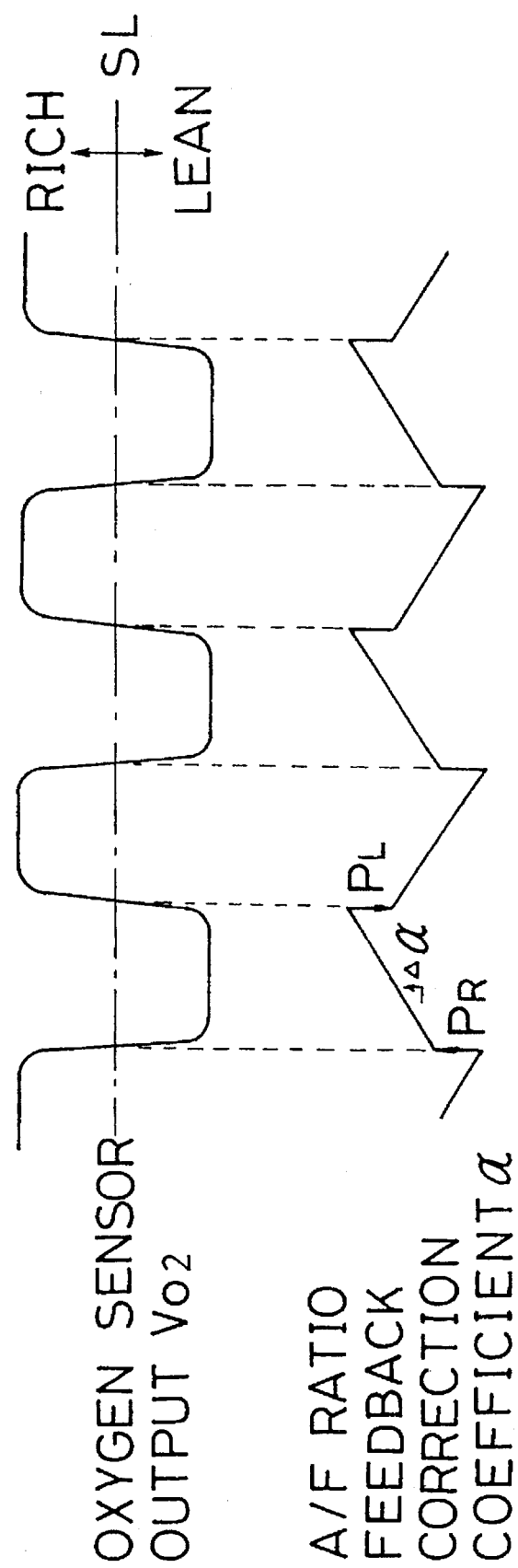
FIG. 9 is a time chart showing aspects of the air-fuel ratio feedback control, according to the second embodiment.

Following is a description with reference to FIG. 7 through FIG. 9, of a second embodiment of a method and apparatus for electronically controlling the fuel supply to an internal combustion engine according to the present invention. The basic structure of the apparatus for electronically controlling the fuel supply according to the second embodiment is shown in FIG. 2, while the system structure of FIG. 3, previously described for the first embodiment, is used as a common system structure for the second embodiment.

The control unit 12 in the second embodiment, computes the injection pulse width Ti as described below.

The control unit 12 computes a basic injection pulse width Tp from the intake air quantity Q detected by the airflow meter 13, and the engine rotational speed Ne computed on the basis of detection signals from the crank angle sensor 14 (Tp=K×Q/Ne, where K is a constant).

It then computes various correction coefficients COEF (COEF=1+$K_{TW}$+ . . . ) including a quantity increase correction coefficient $K_{TW}$ for quantity increase correction of the basic injection pulse width Tp when the engine is cold, in accordance with the cooling water temperature Tw, and sets a voltage correction portion Ts for correcting a change in effective valve open period of the fuel injection valves 6 due to a change in battery voltage (power source voltage of the fuel injection valve 6).

Then, on materialization of the predetermined air-fuel ratio feedback control conditions, it sets an air-fuel ratio feedback correction coefficient α (initial value of 1.0) by proportional-plus-integral control based on the richness or leanness of the actual air-fuel ratio compared to the theoretical air-fuel ratio detected by the output value of the oxygen sensor 20, so that the exhaust gas air-fuel ratio approaches the target air-fuel ratio.

It then detects the engine surge torque (engine output fluctuation) to be mentioned after under the predetermined idle operating conditions, and integral controls the surge torque feedback correction coefficient SCOEF (initially a value of 1.0) so that the surge torque approaches the predetermined value (permissible limit value).

Then it corrects the basic injection pulse width Tp with the various correction coefficients COEF, the voltage correction portion Ts, the air-fuel ratio feedback correction coefficient α, and the surge torque feedback correction coefficient SCOEF to thereby compute a final injection pulse width Ti(Ti=Tp×COEF×SCOEF×a+Ts).

Next is a description in accordance with the flow charts of FIG. 7 and FIG. 8, of the aspects of the computation by the control unit 12, of the air-fuel ratio feedback correction coefficient α, and the surge torque feedback correction coefficient SCOEF.

In the present embodiment, the functions of a fuel supply quantity amendment device, an air-fuel ratio feedback control device and a target air-fuel ratio setting device (see FIG. 2), are provided by software illustrated by the flow charts of FIG. 7 and FIG. 8 and stored in the control unit 12. The output fluctuation detection device is realized, as previously described for the first embodiment, by the function of software illustrated by the flow chart of FIG. 6 and stored in the control unit 12, and by the cylinder pressure sensor 16 (combustion pressure detection device). A detailed description is thus omitted.

The flow chart of FIG. 7 illustrates a program for computing the surge torque feedback correction coefficient SCOEF and the air-fuel ratio feedback correction coefficient α.

In the flow chart of FIG. 7, steps 31 through step 33 determine that the engine 1 is not being staffed, and judge if a predetermined time has elapsed from staff-up, and if idle conditions exist.

When in steps 31 through 33 all three conditions are judged to have materialized, control proceeds to step 34 where the surge torque computed according to the flow chart of FIG. 6 is compared with a previously set predetermined value (surge torque permissible limit value).

When the surge torque detected under the predetermined idle operating conditions is equal to or greater than the predetermined value, control proceeds to step 35 where the surge torque feedback correction coefficient SCOEF is incremented by a predetermined value ΔCOE.

By incrementing the surge torque feedback correction coefficient SCOEF from its initial value of 1.0, the fuel injection quantity is increase corrected so that combustion is stabilized and surge torque reduced.

On the other hand, when the surge torque detected under the predetermined idle operating conditions is less than the predetermined value, control proceeds to step 36 where the surge torque feedback correction coefficient SCOEF is decremented by a predetermined value ΔCOE.

Since the beforementioned predetermined value corresponds to the permissible surge torque value, then when the actual surge torque is less than this value, it can be estimated that further making the air-fuel ratio of the engine intake mixture lean is possible. Therefore, the surge torque feedback correction coefficient SCOEF is reduced as mentioned above, to effect quantity reduction of the fuel injection quantity.

When the surge torque feedback correction coefficient SCOEF is controlled as described above, since the value of the generated surge torque converges on a value close to the permissible limit value, the converged value depends on the properties of the fuel being used at the time.

In particular, when for example during warm up the quantity increase correction has been set by the quantity increase correction coefficient $K_{TW}$ to be appropriate for a heavy fuel with relatively high requirements for quantity increase correction, but the fuel actually being used is a comparatively light weight one, the excess quantity increase correction due to the quantity increase correction coefficient $K_{TW}$ is amended by the surge torque feedback correction coefficient SCOEF so that the quantity increase correction converges on a correction level required for the fuel being used at the time.

That is to say, when a high quality fuel with for example good atomization properties is used, then since good combustibility can be maintained even with a small injection quantity, the surge torque feedback correction coefficient SCOEF is predicted to converge to a comparatively small value. On the other hand, when a low quality fuel having poor atomization properties is used, good mixture formation is not possible if the injection quantity is small, so that surge torque increases. The surge torque feedback correction coefficient SCOEF is therefore predicted to require a comparatively large value.

Here the surge torque feedback correction coefficient SCOEF is controlled with the following air-fuel ratio feedback control clamped. However, the fuel properties predicted as mentioned above from values of the surge torque feedback correction coefficient SCOEF can also affect the air-fuel ratio feedback control.

That is to say, when a high quality fuel with for example good atomization properties is used, and in particular when the engine 1 is large such as an eight cylinder engine with a high displacement volume, since such an engine has a high rotational stability and high output torque, then even if the target air-fuel ratio of the air-fuel ratio feedback control is made lean, it can be estimated that the surge torque exceeding the permissible level will not generate. On the other hand, when a low quality fuel is used, it is judged that the target air-fuel ratio should be made richer so as to stabilize combustion.

In this respect, in step 37 the proportional portions $P_R$, $P_L$ (proportional operating amounts) used in the proportional control of the air-fuel ratio feedback correction coefficient α are variably set to correspond to the level of the surge torque feedback correction coefficient SCOEF.

The proportional portion PR as shown in FIG. 9 is the value used in increase control of the air-fuel ratio feedback correction coefficient α when the air-fuel ratio inverts from richer to leaner than the theoretical air-fuel ratio. Conversely the proportional portion $P_L$ is the value used in decrease control of the correction coefficient α when the air-fuel ratio inverts from leaner to richer than the theoretical air-fuel ratio.

When in step 37 the surge torque feedback correction coefficient SCOEF is large, then the proportional portion $P_R$ is set large while the proportional portion $P_L$ is set relatively small. Conversely, when the surge torque feedback correction coefficient SCOEF is small, then the proportional portion $P_R$ is set small while the proportional portion $P_L$ is set relatively large.

For example, under conditions wherein the correction coefficient SCOEF is large and the properties of the fuel being used are far from geed, it is desirable to make the air-fuel ratio richer to stabilize combustion. In this respect, if as mentioned above the proportional portion $P_R$ is set large and the proportional portion $P_L$ is set small the control point for the air-fuel ratio feedback control can be shifted to the rich side so as to correspond to the required enrichment.

That is to say, the variable setting of the proportional portions $P_R$, $P_L$ in step 37 changes the target air-fuel ratio of the air-fuel ratio feedback control in accordance with the correction coefficient SCOEF, and a target air-fuel ratio corresponding to the properties of the fuel being used at the time is set by making the correction coefficient SCOEF a parameter.

When the proportional portions $P_R$, $P_L$ corresponding to the surge torque feedback correction coefficient SCOEF are variably set, then in the next step 38, it is judged if conditions for carrying out air-fuel ratio feedback control (λ/C) have materialized.

Typical conditions wherein the air-fuel ratio feedback control is stopped (clamped) are; during idling, during low cooling water temperature, during start-up, during slowing down, and during engine operation under high load. When these stop conditions are not relevant, the air-fuel ratio feedback control conditions are taken to be realized. Control then proceeds to step 39 where the air-fuel ratio feedback correction coefficient α is computed using the proportional portions $P_R$, $P_L$ set in step 37.

Aspects of the computation of the air-fuel ratio feedback correction coefficient α in step 39 are illustrated by the flow chart of FIG. 8.

In flow chart of FIG. 8, initially in step 41 an output $V_{O2}$ from the oxygen sensor 20 is read.

Then in the next step 42, the output $V_{O2}$ read in step 41 is compared with a slice level SL corresponding to the theoretical air-fuel ratio, and the richness or leanness with respect to the theoretical air-fuel ratio judged.

Here, when the output $V_{O2}$ is judged greater than or equal to the slice level SL (air-fuel ratio richer than the theoretical air-fuel ratio), control proceeds to step 43 where it is judged if the rich judgement is the first; that is to say if there has been an inversion from a lean to rich air-fuel ratio.

If the first rich judgement, control proceeds to step 44 where the correction coefficient α is decremented by the proportional portion $P_L$ (see FIG. 9).

On the other hand, when judged in step 43 not to be the first rich judgement, control jumps step 44 to step 45 where the correction coefficient α is decremented by a predetermined integral amount Δa.

Moreover, when judged in step 42 that the output $V_{O2}$ is less than the slice level SL (air-fuel ratio leaner than the theoretical air-fuel ratio), then as for the rich judgement it is judged if the lean judgement is the first, and if so the correction coefficient α is incremented by the proportional portion $P_R$. Subsequently, incrementation is continuously carried out with the integral amount Δa until inversion to a rich air-fuel ratio (step 46 though step 48).

With the present embodiment, the control point in the air-fuel ratio feedback control is amended towards the rich or the lean side by the change of the proportional portions $P_R$, $P_L$, essentially making the target air-fuel ratio richer or leaner. Alternatively, the control point (theoretical air-fuel ratio) of the air-fuel ratio feedback control can be changed for example by changing the slice level SL, or by changing a delay time until execution of the proportional control after detection of a rich to lean or lean to rich inversion about the theoretical air-fuel ratio. These parameters obtained for changing the target air-fuel ratio (slice level SL, delay time) can be variably set corresponding to the correction coefficient SCOEF.

I claim:

1. A method of electronically controlling a fuel supply to an internal combustion engine comprising the steps of:

detecting the engine temperature, quantity increase correcting a fuel supply quantity to the engine in accordance with the engine temperature, detecting engine output fluctuations, amending the quantity increase correction amount so that the engine output fluctuations approach a previously set permissible limit value, detecting if a fuel tank which stores fuel for supply to the engine, has been refuelled, and resetting the quantity increase correction amount to an initial value, only when detected that the fuel tank has been refuelled.

2. A method of electronically controlling a fuel supply to an internal combustion engine according to claim 1, wherein said step of detecting refuelling involves the steps of:

detecting an amount of fuel remaining in the fuel tank when a key switch is switched off and storing the detected amount, detecting an amount of fuel remaining in the fuel tank when the key switch is switched on, and determining refuelling based on a difference between the detected amount of fuel remaining when the key switch was switched off and the detected amount of fuel remaining when the key switch was switched on.

3. A method of electronically controlling a fuel supply to an internal combustion engine according to claim 1, wherein said step of detecting output fluctuations involves the steps of detecting combustion pressures of the engine, and detecting engine output fluctuations based on fluctuations in the combustion pressure.

4. A method of electronically controlling a fuel supply to an internal combustion engine according to claim 1, wherein said step of detecting output fluctuations detects engine output fluctuations under engine idle conditions.

5. An apparatus for electronically controlling a fuel supply to an internal combustion engine, said apparatus comprising:

engine temperature detection means for detecting the engine temperature, fuel quantity increase correction means for quantity increase correcting a fuel supply quantity to the engine in accordance with the engine temperature detected by said engine temperature detection means, output fluctuation detection means for detecting engine output fluctuations, quantity increase correction amount amendment means for amending the quantity increase correction amount corrected by said fuel quantity increase correction means, so that the engine output fluctuations detected by said output fluctuation detection means approach a previously set permissible limit value, refuel detection means for detecting if a fuel tank which stores fuel for supply to the engine, has been refuelled, and quantity increase correction reset means for resetting the quantity increase correction amount corrected by said fuel quantity increase correction means to an initial value, only when detected by said refuel detection means that the fuel tank has been refuelled.

6. An apparatus for electronically controlling a fuel supply to an internal combustion engine according to claim 5, wherein said refuel detection means includes a remaining fuel amount detection means for detecting an amount of fuel remaining in the fuel tank, and refuelling is determined based on a difference between a detected amount of fuel remaining when a key switch is switched off and a detected amount of fuel remaining when the key switch is switched on.

7. An apparatus for electronically controlling a fuel supply to an internal combustion engine according to claim 5, wherein said output fluctuation detection means includes a combustion pressure detection means for detecting engine combustion pressures, and engine output fluctuations are detected based on combustion pressure fluctuations detected by said combustion pressure detection means.

8. An apparatus for electronically controlling a fuel supply to an internal combustion engine according to claim 5, wherein said output fluctuation detection means detects engine output fluctuations under engine idle conditions.

* * * * *